United States Patent
Hirate et al.

(10) Patent No.: US 10,654,519 B2
(45) Date of Patent: May 19, 2020

(54) VEHICLE STEERING ASSISTANCE APPARATUS AND METHOD

(71) Applicant: DENSO CORPORATION, Kariya, Aichi-pref. (JP)

(72) Inventors: Yosuke Hirate, Kariya (JP); Daiji Watanabe, Kariya (JP); Hisaya Akatsuka, Kariya (JP); Toshiya Kabayama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/958,507

(22) Filed: Apr. 20, 2018

(65) Prior Publication Data

US 2018/0304920 A1 Oct. 25, 2018

(30) Foreign Application Priority Data

Apr. 21, 2017 (JP) ................. 2017-084078

(51) Int. Cl.
| | |
|---|---|
| *B62D 6/00* | (2006.01) |
| *B62D 5/04* | (2006.01) |
| *B62D 15/02* | (2006.01) |
| *B62D 5/00* | (2006.01) |
| *G05D 1/02* | (2020.01) |

(Continued)

(52) U.S. Cl.
CPC ............ *B62D 6/003* (2013.01); *B62D 1/286* (2013.01); *B62D 5/008* (2013.01); *B62D 5/0463* (2013.01); *B62D 15/022* (2013.01); *B62D 15/025* (2013.01); *B62D 15/0285* (2013.01); *G05D 1/0212* (2013.01); *B62D 3/12* (2013.01)

(58) Field of Classification Search
None
See application file for complete search history.

(56) References Cited

U.S. PATENT DOCUMENTS

| | | | |
|---|---|---|---|
| 9,789,869 B2 * | 10/2017 | Fujita | ................... B60W 30/00 |
| 2012/0123642 A1 | 5/2012 | Kojo | |
| 2012/0123643 A1 | 5/2012 | Limpibunterng et al. | |

(Continued)

FOREIGN PATENT DOCUMENTS

| | | |
|---|---|---|
| JP | H10-226354 A | 8/1998 |
| JP | 2010-149612 A | 7/2010 |

(Continued)

*Primary Examiner* — Tamara L Weber

(74) *Attorney, Agent, or Firm* — Knobbe, Martens, Olson & Bear, LLP

(57) ABSTRACT

In a steering assistance apparatus mounted in a vehicle, a steering input device and a turning device differentiate at a transmission ratio that is a ratio of an amount of change in the turning angle to an amount of change in the steering angle. A turning device actuator actuates the turning device. A controller executes an automatic steering mode, in which the controller determines the turning angle based on at least one of a travel condition and travel path information of the vehicle and controls the turning device actuator so as to achieve the determined turning angle. If detecting an input variation from the steering input device during execution of the automatic steering mode, the controller changes the transmission ratio to a value less than the transmission ratio in the automatic steering mode and prioritizes a manual steering mode over the automatic steering mode.

10 Claims, 6 Drawing Sheets

(51) Int. Cl.
*B62D 1/28* (2006.01)
*B62D 3/12* (2006.01)

(56) References Cited

U.S. PATENT DOCUMENTS

| | | | |
|---|---|---|---|
| 2012/0197496 A1 | 8/2012 | Limpibunterng et al. | |
| 2012/0203431 A1 | 8/2012 | Kojo et al. | |
| 2017/0008557 A1 | 12/2017 | Mitsumoto | |
| 2019/0023318 A1* | 1/2019 | Mitsuishi | B62D 5/0463 |

FOREIGN PATENT DOCUMENTS

| | | |
|---|---|---|
| JP | 2011-031769 A | 2/2011 |
| JP | 2011-079410 A | 4/2011 |
| JP | 2012-166720 A | 9/2012 |
| JP | 2013-233930 A | 11/2013 |
| JP | 2015-063244 A | 4/2015 |
| JP | 2015-137085 A | 7/2015 |
| JP | 2015-182606 A | 10/2015 |
| JP | 2016-168917 A | 9/2016 |
| WO | 2011/161777 A1 | 12/2011 |
| WO | 2011/161779 A1 | 12/2011 |

* cited by examiner

VEHICLE STEERING ASSISTANCE APPARATUS AND METHOD

CROSS-REFERENCE TO RELATED APPLICATION

This application is based on and claims the benefit of priority from earlier Japanese Patent Application No. 2017-84078 filed Apr. 21, 2017, the description of which is incorporated herein by reference.

BACKGROUND

Technical Field

This disclosure relates to a steering assistance technique for controlling a travel trajectory of a vehicle.

Related Art

An automatic steering technique is known, for controlling a turning angle of a turning device using a travel condition of an own vehicle acquired using a detection device, such as a radar, and a travel path information, such as map information, that is, without receiving inputs from a steering input device. When a steering maneuver is performed by a driver of the own vehicle during execution of automatic steering, a change to manual steering is performed, in which the turning device operates in response to a steering angle received via the steering (see, for example, Japanese Patent Application Laid-Open Publication No. 2016-168917).

However, typically, there is a differential angle between the steering angle received from the steering input device and the turning angle received from the turning device, based on a transmission ratio that is a ratio of an amount of change in the turning angle to an amount of change in the steering angle. In many cases, the transmission ratio during execution of automatic steering is set greater than the transmission ratio during execution of manual steering in which the turning device operates in response to a steering angle received via the steering. Therefore, a steering intervention or a change to manual steering performed when a steering maneuver is performed by the driver during execution of automatic steering may give rise to a difference in the transmission ratio, which may cause the driver to feel discomfort. In addition, there has been no due consideration of coordinated operations between automatic steering and manual steering including return to automatic steering after the steering intervention or after the change to manual steering.

In view of the above, it is desired to provide a steering assistance technique for reducing or eliminating steering discomfort that a driver may feel when a steering intervention is performed during automatic steering.

SUMMARY

In accordance with a first aspect of the present disclosure, there is provided a steering assistance apparatus mounted in a vehicle. The vehicle is provided with a steering input device and a turning device configured to differentiate at a transmission ratio that is a ratio of an amount of change ($\Delta\theta w$) in the turning angle to an amount of change ($\Delta\theta s$) in the steering angle. The apparatus including: a turning device actuator configured to actuate the turning device; a controller configured to execute an automatic steering mode, in which the controller determines the turning angle based on at least one of a travel condition and travel path information of the vehicle and controls the turning device actuator so as to achieve the determined turning angle. The controller is configured to, if detecting an input variation from the steering input device during execution of the automatic steering mode, change the transmission ratio to a value less than the transmission ratio ($\alpha$auto) in the automatic steering mode and prioritize a manual steering mode, in which the turning device is actuated responsive to a steering angle input from the steering input device, over the automatic steering mode.

With the steering assistance apparatus according to the first aspect, if an input variation from the steering input device is detected during execution of the automatic steering mode, the transmission ratio is changed to a value less than the transmission ratio in the automatic steering mode and a manual steering mode, in which the turning device is actuated responsive to a steering angle input from the steering input device, the manual steering mode being prioritized over the automatic steering mode, which can reduce or eliminate steering discomfort that a driver of the vehicle may feel when a steering intervention is performed during automatic steering.

In accordance with a second aspect of the present disclosure, there is provided a steering assistance control method for a vehicle. The vehicle is provided with a steering input device and a turning device configured to differentiate at a transmission ratio that is a ratio of an amount of change ($\Delta\theta w$) in the turning angle to an amount of change ($\Delta\theta s$) in the steering angle. The method includes: executing an automatic steering mode, in which the turning angle is determined based on at least one of a travel condition and travel path information of the vehicle and a turning device actuator is controlled so as to achieve the determined turning angle; changing the transmission ratio to a value less than the transmission ratio ($\alpha$auto) in the automatic steering mode if an input variation from the steering input device is detected during execution of the automatic steering mode, and prioritizing a manual steering mode, in which the turning device is actuated responsive to a steering angle input from the steering input device, over the automatic steering mode.

With the steering assistance control method according to the second aspect, if an input variation from the steering input device is detected during execution of the automatic steering mode, the transmission ratio is changed to a value less than the transmission ratio in the automatic steering mode and a manual steering mode, in which the turning device is actuated responsive to a steering angle input from the steering input device, is prioritized over the automatic steering mode, which can reduce or eliminate steering discomfort that a driver of the vehicle may feel when a steering intervention is performed during automatic steering.

DESCRIPTION OF SPECIFIC EMBODIMENTS

Figure 1:
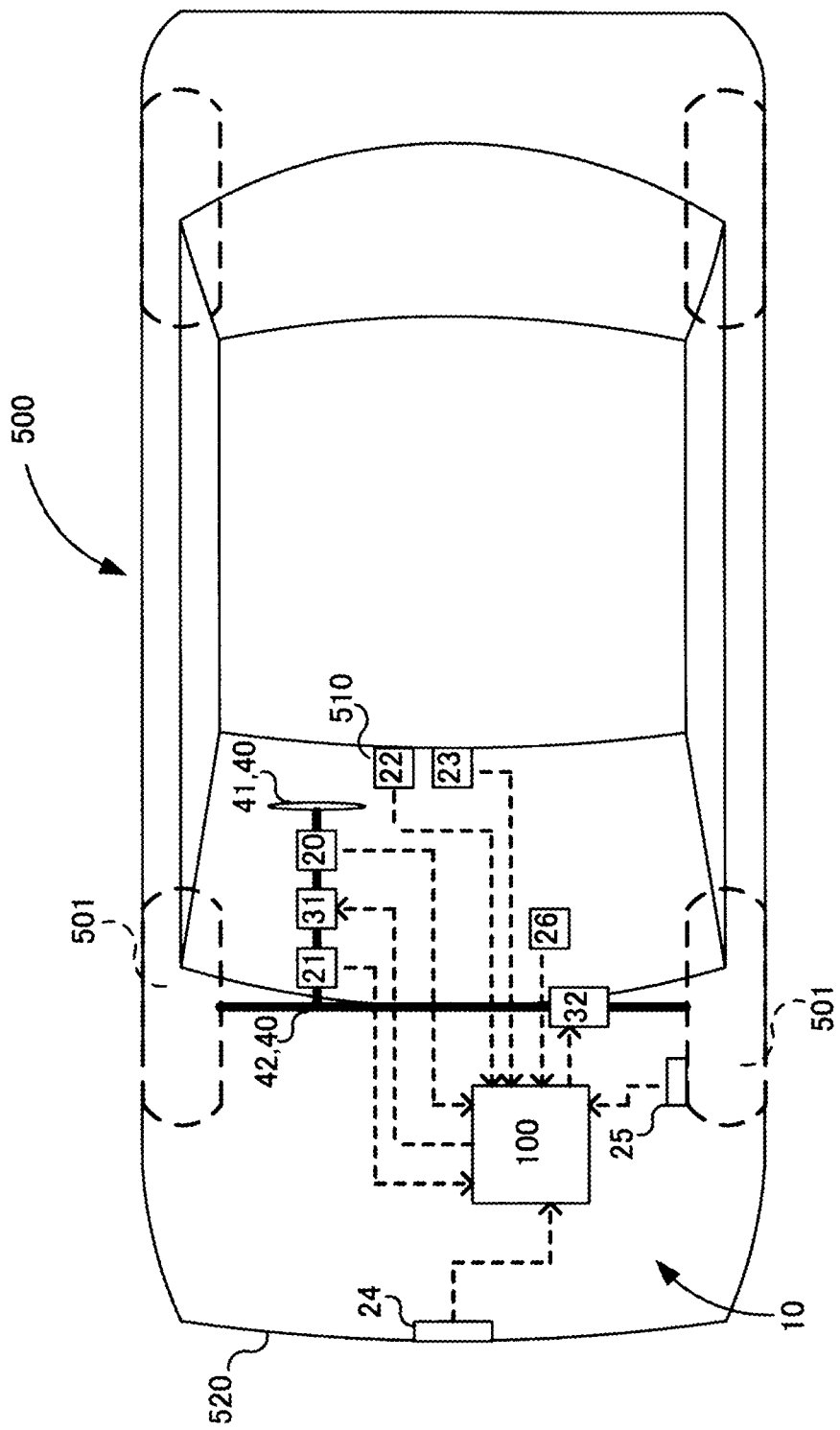
FIG. 1 is an illustration of a vehicle carrying a steering assistance apparatus in accordance with a first embodiment.

Hereinafter, exemplary embodiments of the present disclosure will be described in detail with reference to the accompanying drawings, in which like reference numerals refer to like or similar elements regardless of reference numerals and duplicated description thereof will be omitted.

First Embodiment

As shown in FIG. 1, a steering assistance apparatus 10 in accordance with a first embodiment of the present disclosure is mounted in a vehicle 500. The steering assistance apparatus 10 includes a controller 100, a rotation angle sensor 20 configured to detect a steering angle, a torque sensor 21, a front-facing camera 22, a vehicle interior camera 23, a millimeter-wave radar 24, a wheel speed sensor 25, a global positioning system (GPS) 26, a steering angle variator 31, and a turning assistance device 32. The vehicle 500 includes front wheels 501, a steering wheel 41 as a steering input device, a steering mechanism 40 including a turning device 42, a front windshield 510, and a front bumper 520. The vehicle 500 may include at least millimeter-wave radar 24 or may include at least one of the front-facing cameras 22 and the laser radar (LIDAR) together with the millimeter-wave radar 24. Instead of the millimeter-wave radar 24, the vehicle 500 may include a stereoscopic camera or may include a stereoscopic camera together with the millimeter-wave radar 24. In the present embodiment, the front-facing camera 22 and the millimeter-wave radar 24 are provided as detection means for detecting an object around the vehicle 500.

Figure 2:
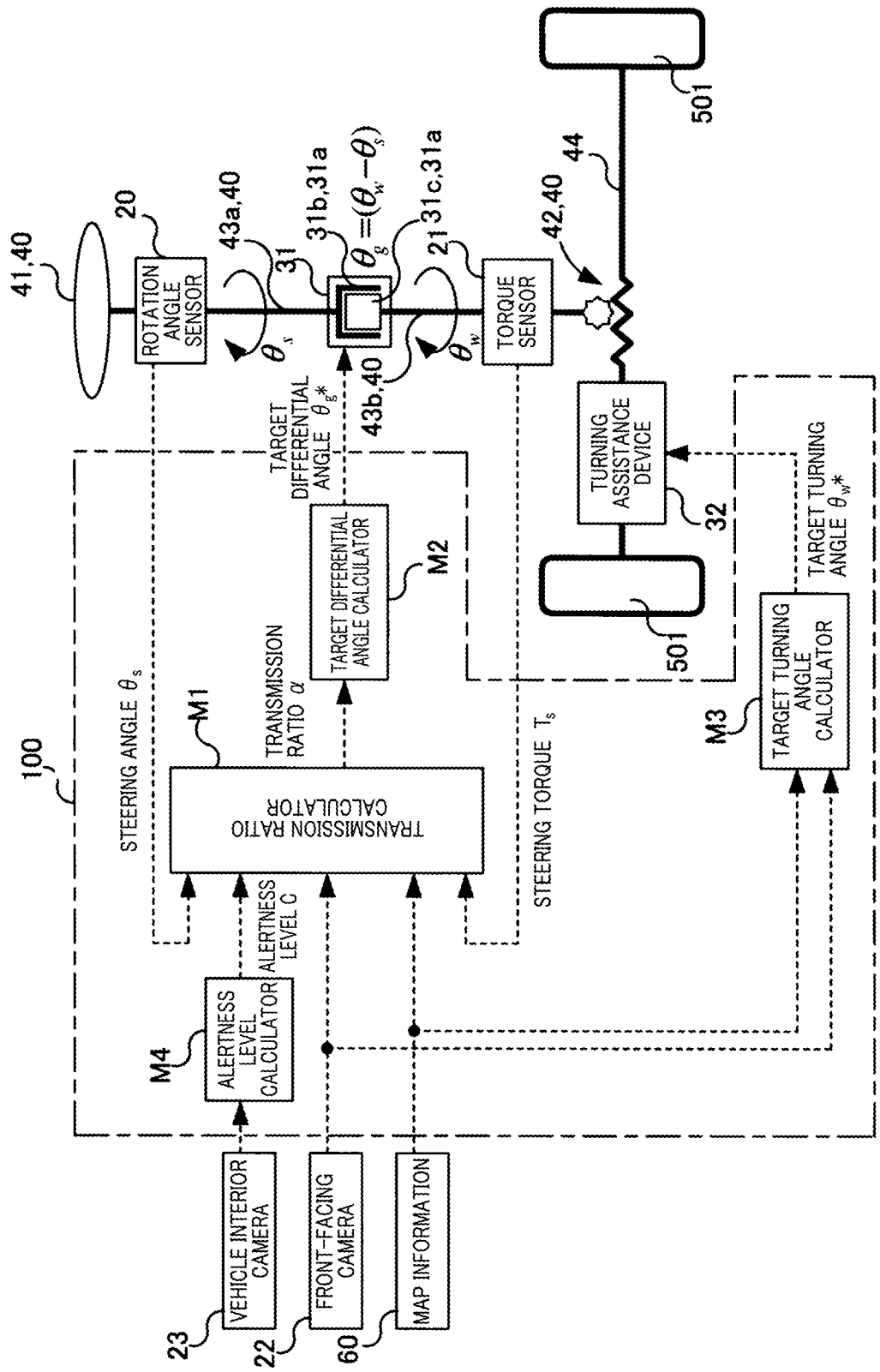
FIG. 2 is a functional block diagram of a controller of the steering assistance apparatus in accordance with the first embodiment.

In the vehicle 500, as shown in FIG. 2, the steering mechanism 40 includes a steering wheel 41 as a steering input device to receive a steering maneuver of the driver, a turning device 42 configured to change a turning angle of the front wheels 501, steering shafts 43a, 43b connecting the steering wheel 41 and the turning device 42, a turn shaft 44 connecting the turning device 42 and the front wheels 501. Instead of the front wheels 501, rear wheels may be turned. In the present embodiment, a steering angle variator 31 is provided. The steering shaft is formed of a upper steering shaft 43a connecting the steering wheel 41 and the steering angle variator 31 and a lower steering shaft 43b connecting the steering angle variator 31 and the turning device 42. The upper steering shaft 43a is provided with a rotation angle sensor 20 to detect a steering angle of the steering wheel 41, that is, a steering position of the steering wheel 41, as a rotation angle of the upper steering shaft 43a. The lower steering shaft 43b is provided with a torque sensor 21 to detect a rotational torque of the lower steering shaft 43b as a steering force.

The turning device 42 includes a pinion gear provided on an end of the lower steering shaft 43b opposite from the other end of the lower steering shaft 43b that the steering angle variator 31 is connected to and a rack gear provided along a turn shaft 44. In such a rack and pinion gear mechanism, rotation of the steering shaft 43b is converted into linear motion in the axis direction of the turn shaft 44.

The turn shaft 44 is thus driven in the axis direction, thereby turning the wheels 501 to a desired angle.

The steering angle variator 31 is configured to generate a continuously variable differential angle between a rotation angle of an input shaft and a rotation angle of an output shaft. The steering angle variator 31 includes a motor 31a and a motor controller (not shown). The motor 31a may be a brushless direct-current (DC) motor. In the motor 31a, a housing to which a stator 31b is secured is connected to the upper steering shaft 43a, and an output shaft of the motor 31a coaxial with a rotor 31c is connected to the lower steering shaft 43b through a speed reducer (not shown). A differential angle θg between the steering angle θs and the turning angle θw, that is, θg=(θw−θs), is uniquely determined by a speed reduction ratio of the speed reducer. The steering angle variator 31 includes the motor 31a, which leads to a variable relative angle between the housing and the output shaft. The differential angle θg between the steering angle of the steering wheel 41 and the turning angle of the turning device 42 therefore becomes continuously variable. The speed reducer may employ a planetary gear mechanism or a strain wave gearing mechanism. If the torque of the motor 31a is large enough, no speed reducer may be provided. In addition, use of a steering mechanism requiring no physical connection between the upper steering shaft 43a and the lower steering shaft 43b, a so called steer-by-wire mechanism, needs no speed reducer.

The turning assistance device 32 includes a motor and a motor controller (both not shown), in which a pinion gear, and as needed, a speed reducer, are fixed on one end of an output shaft of the motor. The pinion gear of the turning assistance device 32 is in mesh with a rack gear provided along the turn shaft 44 such that the turn shaft 44 is driven by a torque of the motor. The turning assistance device 32 corresponds to a turning device actuator that actuates the turning device 42. The turning assistance device 32 is configured to drive the turning device 42 via the turn shaft 44 without a steering force input by the driver via the steering wheel 41, thereby achieving desired turning of the wheels 501. The turning assistance device 32 is used as a steering force assistance device that assists a steering force input by the driver via the steering wheel 41. The turning assistance device 32 may be configured such that the motor is provided coaxial with the turn shaft 44 or may be integrated with the turning device 42.

Figure 3:
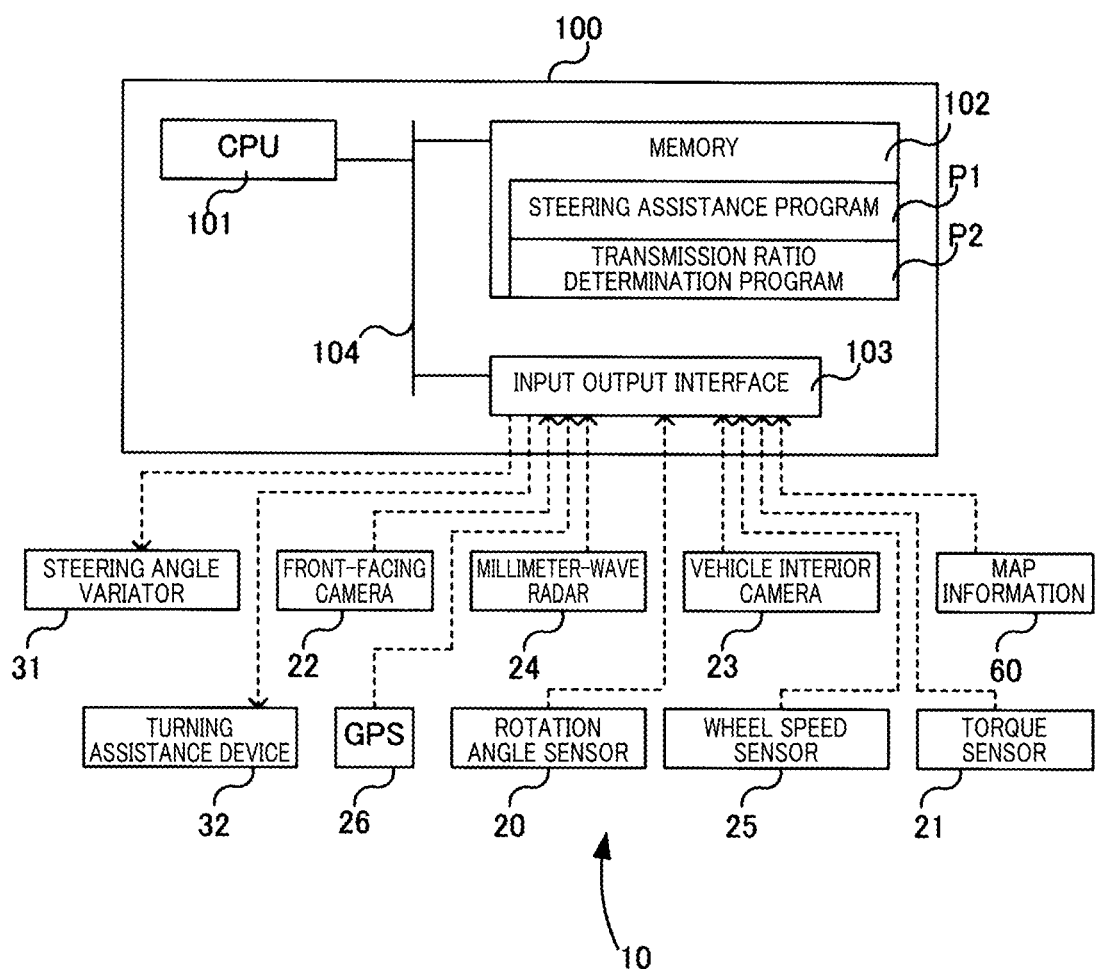
FIG. 3 is a block diagram of the controller of the steering assistance apparatus in accordance with the first embodiment.

As shown in FIG. 3, the controller 100 includes a central processing unit (CPU) 101, a memory 102, an input/output interface 103, and a bus 104. The CPU 101, the memory 102, and the input/output interface 103 are bidirectionally communicably connected to each other via the bus. The memory 102 includes a non-volatile read only memory (ROM) storing a steering assistance program P1 and a transmission ratio determination program P2 and a random access memory (RAM) readable and writable by the CPU 101, and a memory storing navigation map data. The steering assistance program P1 is configured to, based on at least one of the travel condition and travel path information of the of the vehicle, determine a turning angle θw to be achieved by the turning device 42, that is, a target turning angle θw* to perform an automatic steering mode for controlling the turning assistance device 32. The transmission ratio determination program P2 is configured to, if a steering intervention via the steering wheel 41 is detected during the automatic steering mode, determine the transmission ratio α. Executing the steering assistance program P1, the CPU 101 saves as a controller for executing the automatic steering mode. Executing the transmission ratio determination program P2, the CPU 101 saves as a controller configured to, if an input variation from the steering wheel 41, that is, overriding the automatic driving mode (DOR), is detected, stop the automatic steering mode and change the transmission ratio α to the transmission ratio αdor during the steering intervention that is less than the transmission ratio αauto during the automatic steering mode. The controller executing the automatic steering mode may include the turning assistance device 32 that controls the turning angle of the turning device 42 in response to a control signal from the CPU 101, as well as the CPU 101. In the present embodiment, the turning assistance device 32 is a steering device actuator that actuates the turning device 42 to achieve a target turning angle θw* during execution of the automatic steering mode. The CPU 101 may be formed of a single CPU or a plurality of CPUs for executing various programs, or may be formed of a multithreaded CPU capable of executing a plurality of programs.

The rotation angle sensor 20, the torque sensor 21, the front-facing camera 22, the vehicle interior camera 23, the millimeter-wave radar 24, the wheel speed sensor 25, the GPS 26, the steering angle variator 31, and the turning assistance device 32 are connected to the input/output interface 103 via respective control signal lines. Detection information is input from the rotation angle sensor 20, the torque sensor 21, the front-facing camera 22, the vehicle interior camera 23, the millimeter-wave radar 24, the wheel speed sensor 25, and the GPS 26. Control signals for the target differential angle and the target turning angle are output to the steering angle variator 31 and the turning assistance device 32.

The rotation angle sensor 20 is configured to detect a steering position of the steering wheel 41, that is, a rotation angle of the steering wheel 41, as a rotation angle of the upper steering shaft 43a. A steering angle of the steering wheel 41 when the vehicle is traveling straight may be zero. A right rotation angle may be output as a positive value, and a left rotation angle may be output as a negative value. In an alternative embodiment, the number of rotations and an absolute angle (≤360 degrees) may be output as a steering angle. The rotation angle sensor 20 may be a magnetic rotation angle sensor.

The torque sensor 21 is configured to detect a rotational torque of the lower steering shaft 43b as a steering force input via the steering wheel 41. The torque sensor 21 detects a steering torque that is a steering force by detecting a phase difference generated as a function of a torsion experienced by a torsion bar connecting two split sections (not shown) of the lower steering shaft 43b. The steering torque detected during clockwise/counter-clockwise turning takes a positive/negative value, where a steering angle of the steering wheel 41 when the vehicle is traveling straight is zero. The torque sensor 21 may be integrated with a rotation angle sensor to detect a turning angle. The torque sensor 21 may be provided along the upper steering shaft 43a.

The front-facing camera 22 is an imaging device including a single imaging element, such as a charge-coupled device (CCD), configured to receive visible light to output profile information of an object as image data. The image data output from the front-facing camera 22 is configured as temporal sequence of frame images, where each frame image is expressed by pixel data. In the present embodiment, the front-facing camera 22 is disposed at the upper center of the front windshield 510. The pixel data output from the front-facing camera 22 may be black-and-white pixel data or color pixel data. The front-facing camera 22 may be a monocular camera or a binocular stereoscopic camera.

The vehicle interior camera 23 is similar in configuration to the front-facing camera 22. The vehicle interior camera 23 is used to detect a condition of the driver in a passenger compartment of the vehicle, such as an angle of the driver's head, a condition of eyelids, gaze movement or the like.

The millimeter-wave radar 24 is configured to emit millimeter waves and receive reflected waves from an object, thereby detecting a position of the object and a distance to the object. In the present embodiment, the millimeter-wave radar 24 is disposed at the center of the front bumper 520. In some other embodiments, a plurality of millimeter-wave radars may be disposed across the front bumper 520 or at both ends of the front bumper 520. A detection signal output from the millimeter-wave radar 24 may be a received signal processed in a processing circuit of the millimeter-wave radar 24, formed of a sequence of points representing a position of the object, or may be unprocessed received signal. If the unprocessed signal is used as a detection signal, signal processing for determining a position of the object and a distance to the object is performed in the controller 100. Instead of the millimeter-wave radar, a LIDAR may be used.

The wheel speed sensor 25 is provided to each front wheel 501 to detect a rotational speed of the front wheel 501. A detection signal output from the wheel speed sensor 25 is a pulse wave representing a voltage value proportional to a wheel speed or a spacing corresponding to the wheel speed. Use of the detection signal from the wheel speed sensor 25 enables acquisition of information about a vehicle speed, a travel distance of the vehicle or the like.

The global positioning system (GPS) 26 is a system for determining a location (latitude, longitude) of the vehicle, where the system includes a receiver that receives signals from GPS satellites and a controller that uses the received signals to determine a location of the receiver. The controller 100 uses the location of the own vehicle acquired by the GPS 26 and map information 60 including the location of the own vehicle acquired by the GPS 26 mapped onto map data to determine travel path information. The travel path information may further include information acquired via communications with the other vehicles and traffic information acquired via traffic information infrastructures.

As shown in FIG. 2, the controller 100 includes, as functional blocks, a transmission ratio calculator M1, a target differential angle calculator M2, a target turning angle calculator M3, and an alertness calculator M4. Functions of these blocks can be implemented by the CPU 101 executing various programs. The transmission ratio calculator M1 is implemented by the CPU 101 executing the transmission ratio determination program P2. The transmission ratio calculator M1 calculates a transmission ratio α that is a ratio of an amount of change (Δθw) in the turning angle to an amount of change (Δθs) in the steering angle, that is, α=Δθw/Δθs. The transmission ratio calculator M1 determines a transmission ratio α responsive to the steering mode of the vehicle. During the steering intervention, the transmission ratio α is set to the steering intervention transmission ratio αdor. During the automatic steering mode, the transmission ratio α is set to the automatic steering transmission ratio αauto. To suppress movement of the steering wheel 41, the automatic steering transmission ratio αauto is set greater than the steering intervention transmission ratio αdor during the steering intervention. The transmission ratio calculator M1 determines that a steering intervention has been performed by the driver during execution of the automatic steering mode if detecting that at least one of the steering angle θs and the steering torque Ts is equal to or greater than a determination steering angle θt or a determination steering torque Tt. The transmission ratio α during the steering intervention may be equal to or different from a manual steering transmission ratio in a manual steering mode where the turning device 42 is actuated responsive to a steering angle θs input from the steering wheel 41. That is, a steering mode after detection of the steering intervention may be a manual steering mode overriding the automatic steering mode or a manual steering mode switched from the automatic steering mode, where a transmission ratio α in the manual steering mode may be used.

The target differential angle calculator M2 uses the transmission ratio α to calculate a target differential angle θg* that is a differential angle to be achieved by the steering angle variator 31. The target differential angle calculator M2, which is implemented by the CPU 101 executing the transmission ratio determination program P2, uses the transmission ratio α calculated by the transmission ratio calculator M1 to calculate the target differential angle θg* according to the following equation:

$$\theta g^* = (\alpha - 1)\theta s \qquad (1)$$

The target differential angle calculator M2 transmits the calculated target differential angle θg* to the steering angle variator 31. In the steering angle variator 31, the motor controller converts the received target differential angle θg* into a motor torque command value for the target differential angle θg* and controls the motor to achieve the target differential angle θg*. In an alternative embodiment, instead of the target differential angle θg*, the target differential angle calculator M2 may calculate an amount of change in the target differential angle Δθg* and transmits it to the motor controller. In such an embodiment, the motor controller may calculate a motor torque command value by adding the acquired angle θg to the amount of change in the target differential angle Δθg*. The amount of change in the target differential angle Δθg* is calculated from the amount of change in the steering angle Δθs according to the following equation:

$$\Delta\theta g^* = (\alpha - 1)\Delta\theta s \qquad (1')$$

An amount of change in movement of the steering wheel 41 is visually perceived. A motor torque command value is a command value that achieves a target differential angle θg*.

The target turning angle calculator M3 calculates a target turning angle θw* that is a turning angle to be achieved by the turning assistance device 32, using a travel condition including a video signal from the front-facing camera 22 and a detection result signal from the millimeter-wave radar 24 and travel path information including map information 60. The target turning angle θw*, which is independent of a steering angle input by the driver from the steering wheel 41, is a turning angle θw of the turning device 42 determined based on a travel condition, such as a speed of the own vehicle, forward and sideward vehicles and other obstacles on a pathway of the own vehicle, and travel path information including a travel path shape, such as a straight path or curve, an increase or decrease in the number of lanes, or a slope road. The target turning angle θw* is transmitted from the target turning angle calculator M3 to the motor controller of the turning assistance device 32. The turning assistance device 32 converts the target turning angle θw* to a motor torque command value that achieves the target turning angle θw* received by the motor controller and controls the motor to achieve the target turning angle θw*.

The alertness level calculator M4 calculates the logical AND of an amount of time for which an angle or position of a driver's head acquired from the vehicle interior camera 23 is out of reference position, an amount of time for which drive's eyelids are closed, and the number per unit of time of driver's gaze movement, as an alertness level C of the driver. The alertness level C is an indicator of driver's drowsiness or fatigue such that the alertness level C decreases with increasing level of drowsiness or fatigue. As parameters used to calculate or estimate the alertness level C may further include electrocardiogram, physiological information, such as a brain wave or the like, vehicle information, such as a steering angle, an accelerator pedal position or the like.

The automatic steering mode is executed by the CPU 101 executing the steering assistance program P1. The CPU 101 determines a travel trajectory of the own vehicle based on a travel condition including a condition of the own vehicle and a condition of other vehicles, and travel path information including the map information 60, and based on an own-vehicle speed detected by the wheel speed sensor 25 and map information 60 onto which a location of the own vehicle is mapped using the GPS 26, sequentially determines a target turning angle θw* that is a turning angle to which the front wheels 501 are to be turned and transmits the target turning angle θw* to the turning assistance device 32. The motor controller of the turning assistance device 32 applies to the motor a torque command value, e.g., an applied voltage, corresponding to the received target turning angle θw*, thereby achieving the target turning angle θw*. In the automatic steering mode, not only the travel condition and the travel path information, but also route information programmed in advance, and guidance information that is information form guidance information providers located along a roadway to provide beacons or the like.

Upon detecting a driver's steering intervention based on a detection signal input from at least one of the rotation angle sensor 20 and the torque sensor 21, the CPU 101 allows for an override prioritizing a steering maneuver in the manual steering mode over the automatic steering mode. During the override, the automatic steering mode may be continued, where a turning angle θw in the manual steering mode, that is, a turning angle θw based on a steering angle θs input via the steering wheel 41 and the transmission ratio α, is input to the turning assistance device 32 in preference to a target turning angle θw* in the automatic steering mode. In an alternative embodiment, during the override, the automatic steering mode may be suspended or terminated, where the steering intervention may be canceled and the automatic steering mode may be resumed.

The automatic steering mode may be executed in any one of aspects of automatic driving including a first aspect where only steering is assisted based on at least one of the travel condition and the travel path information, a second aspect where accelerating and steering of the vehicle are assisted, and a third aspect where braking and steering of the vehicle are assisted. The automatic steering mode is executed not only during vehicle driving on a public highway or an expressway, but also during vehicle parking in a parking lot or during starting from rest in a parking lot. The automatic steering mode may be continued until a switch for turning on and off the automatic steering mode is turned off or until a switch for turning on and off automatic driving is turned off. Therefore, if no steering intervention is detected for a predetermined time period after detection of a steering intervention by the driver, prioritizing the manual steering mode is ended, and thereafter the automatic steering mode is resumed or restarted from suspension.

Figure 4:
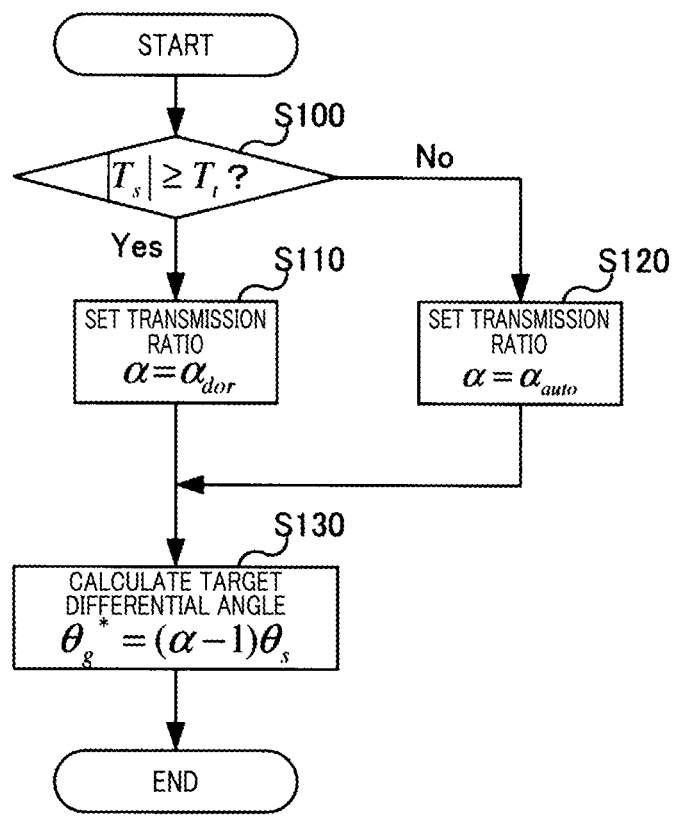
FIG. 4 is a flowchart of transmission ratio determination processing performed in the steering assistance apparatus in accordance with the first embodiment.

Transmission ratio determination processing performed in the steering assistance apparatus 10 of the first embodiment will now be described with reference to FIG. 4. The processing routine shown in FIG. 4 is performed by the CPU 101 executing the steering assistance program P1, and after an automatic steering mode switch is turned on, the CPU 101 executing the transmission ratio determination program P2. The processing routine is iteratively performed every predetermined time interval until the automatic steering mode switch is tuned off.

At step S100, the CPU 101 determines whether or not an absolute value of the steering torque value Ts input from the torque sensor 21 is equal to or greater than a determination torque value Tt. That is, based on whether the steering torque is high or low, the CPU 101 determines whether or not the steering intervention has been performed. The determination torque value Tt is a predetermined torque value stored in the memory 102 that exceeds a steering force required to hold a current position of the steering wheel 41 and intended to change a turning angle of the front wheels 501. The steering interventions performed by the driver include a turning angle increasing operation, that is, a forward intervention that causes an increase in the turning angle, and a turning angle returning operation, that is, a reverse intervention that causes a decrease in the turning angle. The reverse intervention includes wheel turning to a turning angle having a sign opposite to a sign of the current turning angle. The presence or absence of an input variation may be determined based on whether or not a displacement of the steering angle θs has exceeded a reference value.

If at step S100 it is determined that the absolute value of the steering torque value Ts is equal to or greater than the determination torque value Tt, that is, |Ts|≥Tt, at step S110, the CPU 101 sets the transmission ratio α to the transmission ratio αdor during the steering intervention. The transmission ratio αdor during the steering intervention is a transmission ratio α when the steering intervention is being performed and satisfies the following inequality: αdor<αauto. When determining the transmission ratio α, the CPU 101 saves as the transmission ratio calculator M1.

If at step S100 it is determined that the absolute value of the steering torque value Ts is less than the determination torque value Tt, that is, |Ts|<Tt, then at step S120 the CPU 101 sets the transmission ratio α to the transmission ratio αauto during the automatic steering mode. If the automatic steering mode is now being performed, the current transmission ratio α will be maintained. If the steering intervention by the driver has been detected and then the vehicle has returned to the automatic steering mode after a predetermined amount of time, the transmission ratio α will be returned to the transmission ratio αauto during the automatic steering mode.

At step S130, the CPU 101 calculates a target differential angle θg* using the transmission ratio α set at step S110 or S120. Thereafter, the process flow ends. The target differential angle θg* is calculated using the following equation (2), where the CPU 101 serves as the target differential angle calculator M2.

$$\theta g^* = (\alpha - 1)\theta s \quad (2)$$

The CPU 101 transmits the calculated target differential angle θg* to the steering angle variator 31. The motor controller of the steering angle variator 31 applies a voltage value that generates a rotational torque achieving the received target differential angle θg* to the motor, thereby actuating the steering angle variator 31.

In the steering assistance apparatus 10 according to the first embodiment described above, if a steering intervention is performed during execution of the automatic steering mode, the transmission ratio α is set to the transmission ratio αdor that is less than the transmission ratio αauto in the automatic steering mode. This configuration can prevent or inhibit a larger turn of the vehicle than perceived by the driver of the vehicle from a steering angle or amount of the steering wheel 41 if the transmission ratio αauto is continued to be used even during the steering intervention.

In the steering assistance apparatus 10 according to the first embodiment described above, upon termination of the steering intervention, the transmission ratio α is returned to the transmission ratio αauto in the automatic steering mode. Therefore, even in the case of a large turning angle θw of the turning device 42, this configuration can provide a reduced steering angle θs of the steering wheel 41, which can reduce or eliminate visual discomfort that the driver may feel upon execution of the automatic steering mode. If a steering intervention is thereafter detected again, the transmission ratio α is again set to a smaller value, that is, the transmission ratio αdor that is less than the transmission ratio αauto in the automatic steering mode. In this way, each time a steering intervention is detected, the transmission ratio α is changed. Such a sequence of operations may be iterated. Therefore, even if the steering mode is repeatedly switched between the automatic steering mode and the manual steering mode, cooperation between the automatic steering mode and the driver can be accomplished without causing the driver to feel discomfort or while reducing discomfort the driver may feel.

Second Embodiment

A steering assistance apparatus according to a second embodiment will now be described. The steering assistance apparatus according to the second embodiment is similar in configuration to the steering assistance apparatus 10 according to the first embodiment, except in that the transmission ratio α during the steering intervention performed by the driver of the own vehicle is corrected taking into account a road curvature. In the second embodiment, elements having the same functions as in the first embodiment are numbered the same, and will not be described again for brevity.

Figure 5:
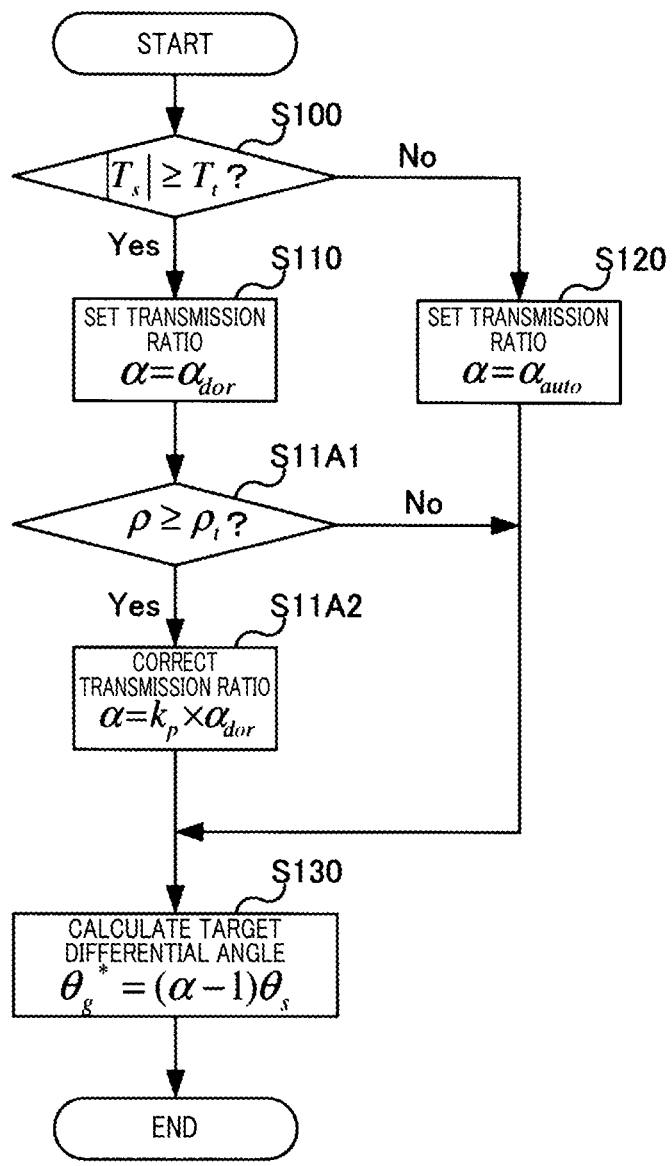
FIG. 5 is a flowchart of transmission ratio determination processing performed in a steering assistance apparatus in accordance with a second embodiment.

Transmission ratio determination processing performed in the steering assistance apparatus 10 according to the second embodiment will now be described with reference to FIG. 5. A processing routine shown in FIG. 5 is similar to the processing routine shown in FIG. 4 and performed in a similar manner. Similar steps of the processing routines shown in FIGS. 4 and 5 are numbered the same, and will not be described again.

At step S100, the CPU 101 determines whether or not an absolute value of a steering torque value Ts input from the torque sensor 21 is equal to or greater than a determination torque value Tt. If it is determined that the absolute value of the steering torque value Ts is equal to or greater than the determination torque value Tt, i.e., |Ts|≥Tt (the "Yes" branch from step S100), then at step S110 the CPU 101 sets the transmission ratio α to the transmission ratio αdor during the steering intervention. At step S11A1, the CPU 101 determines whether or not a road curvature ρ is equal to or greater than a determination curvature ρt. If it is determined that the road curvature ρ is equal to or greater than the determination curvature ρt, i.e., ρ≥ρt (the "Yes" branch from step S11A1), then at step S11A2 the CPU 101 corrects the transmission ratio αdor to a transmission ratio α according to the equation (3). The determination curvature ρt corresponds to, for example, a curve having so large a road curvature ρ as to require an increased turning amount of the steering wheel 41.

$$\alpha = kp \times \alpha dor \quad (3)$$

The road curvature ρ may be acquired by analyzing travel path video captured by the front-facing camera 22 or by using road curvature information included in the map information 60. The coefficient kp may be acquired from a function of the road curvature p as a variable or may be a predetermined constant. Regarding the coefficient kp as a function of the road curvature ρ enables more refined correction or change of the transmission ratio responsive to the road curvature, thereby improving maneuverability perceived by the driver. The corrected transmission ratio α is set greater than the transmission ratio αdor during the steering intervention and less than the transmission ratio αauto during the automatic steering mode.

If it is determined that the road curvature ρ is less than the determination curvature ρt, i.e., ρ<ρt (the "No" branch from step S11A1), then the process flow proceeds to step S130. At step S130, the transmission ratio αdor during the steering intervention that is prepared in advance is used without correcting the transmission ratio αdor.

If it is determined that the absolute value of the steering torque value Ts is less than the determination torque value Tt, i.e., |Ts|<Tt (the "No" branch from step S100), then at step S120 the CPU 101 sets the transmission ratio α to the transmission ratio αauto during the automatic steering mode. The process flow proceeds to step S130.

At step S130, the CPU 101 calculates a target differential angle θg* using the transmission ratio α set at step S11A2 or S120. Thereafter, the processing routine ends.

The CPU 101 transmits the calculated target differential angle θg* to the steering angle variator 31. The motor controller of the steering angle variator 31 applies to the motor a voltage value for generating a rotational torque that achieves the target differential angle θg*, thereby actuating the steering angle variator 31.

In addition to the advantages of the first embodiment described above, the steering assistance apparatus 10 according to the second embodiment can provide an advantage that the transmission ratio can be set responsive to a road curvature. More specifically, for a curve having so large road curvature ρ as to require an increased steering amount of the steering wheel 41, such as a tighter curve, the transmission ratio α is corrected so as to increase with increasing road curvature ρ. With this configuration, even if alternative grips on the steering wheel 41 are required to increase a steering amount of the steering wheel 41, a steering amount of the steering wheel 41 can be suppressed without greatly steering the steering wheel 41, which can provide enhanced steering for the steering wheel 41 during the steering intervention.

Third Embodiment

A steering assistance apparatus according to a third embodiment will now be described. The steering assistance apparatus according to the third embodiment is similar in configuration to the steering assistance apparatus 10 according to the first embodiment, except in that the transmission ratio α during the steering intervention performed by the driver of the own vehicle is corrected taking into account an alertness level of the driver. In the third embodiment, elements having the same functions as in the first embodiment are numbered the same, and will not be described again for brevity.

Figure 6:
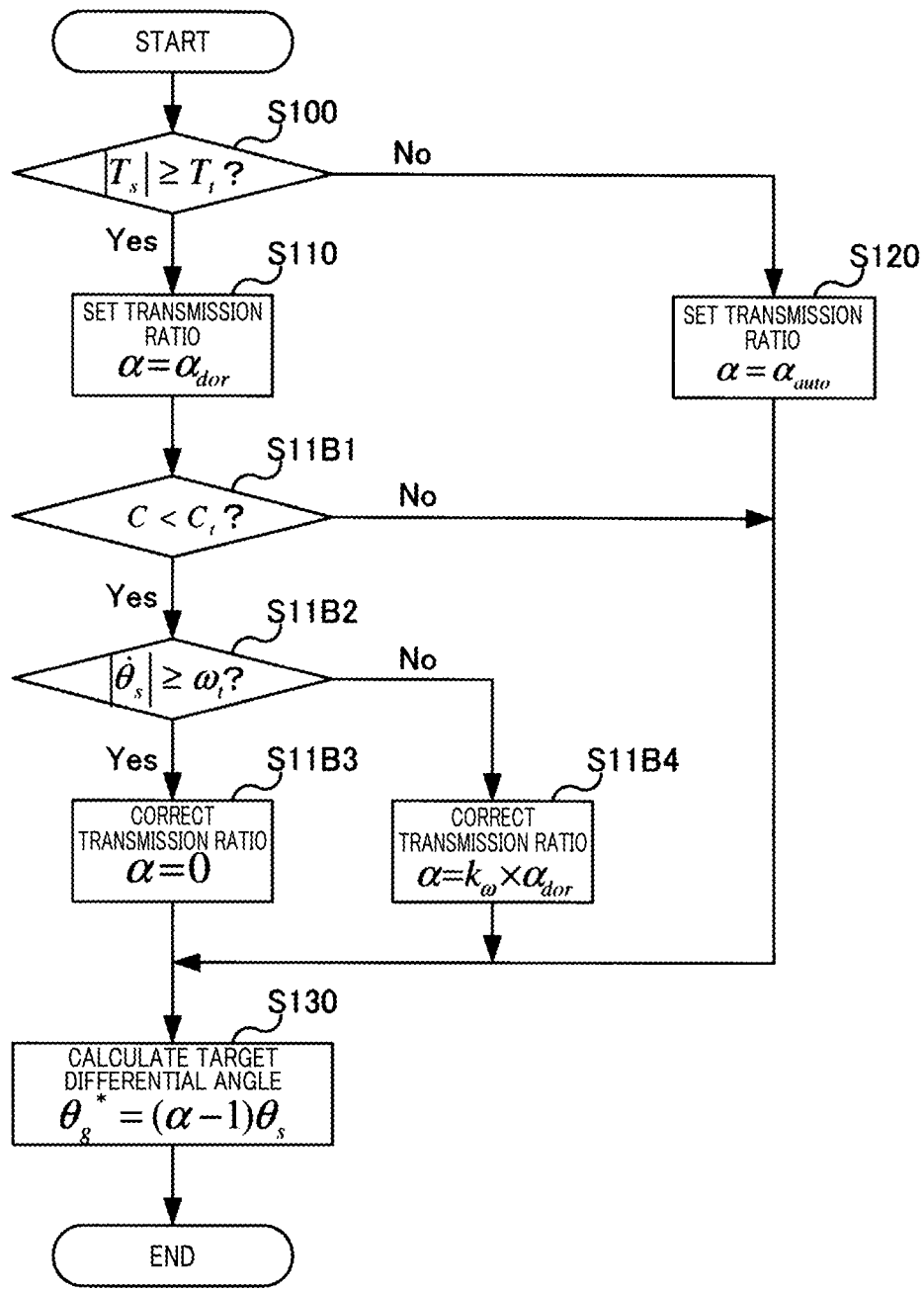
FIG. 6 is a flowchart of transmission ratio determination processing performed in a steering assistance apparatus in accordance with a third embodiment.

Transmission ratio determination processing performed in the steering assistance apparatus 10 according to the third embodiment will now be described with reference to FIG. 6. A processing routine shown in FIG. 6 is similar to the processing routine shown in FIG. 4 and performed in a similar manner. Similar steps of the processing routines shown in FIGS. 4 and 6 are numbered the same, and will not be described again.

At step S100, the CPU 101 determines whether or not an absolute value of a steering torque value Ts input from the torque sensor 21 is equal to or greater than a determination torque value Tt. If it is determined that the absolute value of the steering torque value Ts is equal to or greater than the determination torque value Tt, i.e., |Ts|≥Tt (the "Yes" branch from step S100), then at step S110 the CPU 101 sets the transmission ratio α to the transmission ratio αdor during the steering intervention. At step S11B1, the CPU 101 determines whether or not the alertness level C calculated or acquired is less than a determination alertness level Ct as a first threshold, where the CPU 101 serves as the alertness level calculator M4.

If at step S11B1 the CPU 101 determines that the alertness level C calculated or acquired by the alertness level calculator M4 is less than a determination alertness level Ct, i.e., C<Ct, then at step S11B2 the CPU 101 determines whether or not an absolute value of a rate of change in the steering angle θs of the steering wheel 41, that is, an absolute value of a differential value of the steering angle θs of the steering wheel 41, is equal to or greater than a determination angular speed ωt. The determination alertness level Ct is a predefined alertness level at which attention must be paid to driving. The determination angular speed ωt is an angular speed corresponding to a sudden steering maneuver for the steering wheel 41, which indicates that the steering maneuver is abnormal.

If at step S11B2 it is determined that the absolute value of the rate of change in the steering angle θs of the steering wheel 41 is equal to or greater than the determination angular speed ωt, then at step S11B3 the CPU 101 sets the transmission ratio α to zero, i.e., α=0. In cases where the alertness level C is less than the determination alertness level Ct and rapid steering of the steering wheel 41 has been detected, it is likely that a driver's unintended maneuver for the steering wheel 41 has been performed. Therefore, setting the transmission ratio α to zero so as not to transmit the maneuver for the steering wheel 41 to the turning device 42, thereby preventing rapid turning of the own vehicle. It may be the case that the driver has nodded off to sleep or lost consciousness.

If at step S11B2 it is determined that the absolute value of the differential value of the steering angle θs of the steering wheel 41 is less than the determination angular speed ωt, then at step S11B4 the CPU 101 corrects the transmission ratio αdor to a transmission ratio α according to the equation (4).

$$\alpha = k\omega \times \alpha dor \quad (4)$$

The coefficient kω may be acquired from a function of the alertness level C as a variable or may be a predetermined constant. In any case, the coefficient kω decreases as the alertness level C decreases. Regarding the coefficient kω as a function of the alertness level C enables more refined correction or change of the transmission ratio responsive to the alertness level C, thereby providing a proper maneuver for an unconscious, low alertness level C of the driver and improving maneuverability perceived by the driver.

If at step S11B1 it is determined that the alertness level C is equal to or greater than the determination alertness level Ct, i.e., C≥Ct, then the process flow proceeds to step S130. At step S130, the transmission ratio αdor during the steering intervention that is prepared in advance is used without correcting the transmission ratio αdor.

If at step S100 it is determined that the absolute value of the steering torque value Ts is less than the determination torque value Tt, i.e., |Ts|<Tt, then at step S120 the CPU 101 sets the transmission ratio α to the transmission ratio αauto during the automatic steering mode. The process flow proceeds to step S130.

At step S130, the CPU 101 calculates a target differential angle θg* using the transmission ratio α set at step S11B3, S11B4, or S120. Thereafter, the processing routine ends. The target differential angle θg* is calculated using the above equation (2).

The CPU 101 transmits the calculated target differential angle θg* to the steering angle variator 31. The motor controller of the steering angle variator 31 applies to the motor a voltage value for generating a rotational torque that achieves the target differential angle θg*, thereby actuating the steering angle variator 31.

In addition to the advantages of the first embodiment described above, the steering assistance apparatus 10 according to the third embodiment can provide an advantage that the transmission ratio can be set responsive to an alertness level C and a steering speed of the steering wheel 41. More specifically, for a low alertness level C, the transmission ratio αdor during the steering intervention is also corrected to a smaller value of the transmission ratio α. Therefore, with this configuration, even in the event of the driver having performed an unintended maneuver for the steering wheel 41, an amount of change in the turning angle is suppressed to a small value, which may prevent a change in behavior of the own vehicle, such as a driver's unintended turning of the own vehicle or lane change. When not only the alertness level C, but also the steering speed of the steering wheel 41 is taken into account, the transmission ratio α is set to zero, so that no maneuver for the steering wheel 41 is performed, that is, the steering angle θs is not transmitted to the turning device 42. Therefore, even in the event of the driver having performed an unintended maneuver for the steering wheel 41, the turning angle does not change, which can prevent a rapid change in behavior of the own vehicle, such as a driver's unintended turning of the own vehicle or lane change.

Without consideration of the alertness level C, only a steering speed of the steering wheel 41 may be taking into account. With this configuration, even in the event of a driver's unexpected rapid steering of the steering wheel 41, a rapid change in behavior of the own vehicle can be prevented.

Modifications (1) First Modification

In each of the above embodiments, a combination of the steering angle variator 31 and the turning assistance device 32 forms the steering mechanism 40. In an alternative embodiment, a steer-by-wire mechanism may be provided between the steering wheel 41 and the turning device 42 with no mechanical connection therebetween. In such an embodiment, a motor for providing a reaction force is fixed on the end of the upper steering shaft to which the steering wheel 41 is connected. The turning device 42 is provided with a turning device actuator including a motor. During the manual steering mode, the controller 100 determines a turning angle, controls the turning assistance device 32, and actuates the turning device 42. Further, instead of the steering wheel 41 as a steering input device, a stick-like steering input device, that is, a steering stick, may be used. The steering stick may be reciprocated linearly along a straight line with a neutral position at the middle point, where an operational position along the straight line corresponds to a steering angle θs. The steering position as an operational position is converted into a steering angle θs to be used in the processing described above. Thus, the steering angle from the steering input device conceptually encompasses the steering position. Also in such an embodiment, use of the amount of change in the steering position creates a similar problem to use of the amount of change in the steering angle. The alternative embodiment where the steer-by-wire mechanism is used can also provide similar advantages to those described above.

(2) Second Modification

In each of the above embodiments, a determination as to whether the steering intervention has been performed or released is made based on whether or not the absolute value of the steering torque Ts is equal to or greater than the absolute value of the determination torque value Tt. In an alternative embodiment, a determination as to whether the steering intervention has been performed or released is made based on whether or not the absolute value of the steering torque Ts has continued to be equal to or greater than the absolute value of the determination torque value Tt for a predetermined time period. This configuration can prevent an erroneous determination or undesired determination that may be caused by a peak value, thereby improving the determination accuracy as to whether the steering intervention has been performed or released.

(3) Third Modification

In an alternative embodiment to each of the above embodiments, the transmission ratio α may be corrected responsive to a distance between a white line and the own vehicle, as well as the travel path information. For example, for a large distance between the white line and the own vehicle, decreasing the transmission ratio α can prevent an increase in such a distance. In another alternative embodiment, road surface µ information may be estimated using the front-facing camera 22 and vehicle-vehicle communications, thereby correcting the transmission ratio α. For example, in the case of the road surface with a low friction coefficient, the transmission ratio α may be decreased, which can prevent turning of the front wheels 501 and reduce slip.

(4) Fourth Modification

The first to third embodiments may be appropriately combined. In addition, determination processing in the respective embodiments may be appropriately combined. For example, in the case of a low alertness level C and a small distance between the white line and the own vehicle, the transmission ratio α may be set zero, thereby preventing a lane change to an oncoming lane. In the case of a low alertness level C and a large distance between the white line and the own vehicle, where it may be determined that the own vehicle is facing a direction that diverges away from the own travel lane, the transmission ratio α may be set to zero, thereby executing the automatic steering mode to stay in the own lane.

The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

What is claimed is:

1. A steering assistance apparatus mounted in a vehicle, the vehicle being provided with a driver steering interface and a turning gear configured to have therebetween a transmission ratio that is a ratio of an amount of change in the turning angle to an amount of change in the steering angle, the apparatus comprising:
    a turning gear actuator configured to actuate the turning gear;
    a controller configured to execute an automatic steering mode, in which the controller determines the turning angle based on at least one of a travel condition and travel path information of the vehicle and controls the turning gear actuator so as to provide the determined turning angle,
    wherein the controller is configured to, if detecting an input variation from the driver steering interface during execution of the automatic steering mode, change the transmission ratio to a value less than the transmission ratio in the automatic steering mode, and prioritize a manual steering mode, in which the turning gear is actuated responsive to a steering angle input from the driver steering interface, over the automatic steering mode, and wherein the controller is configured to, if no input variation is detected for a predetermined time period after detection of the input variation from the driver steering interface, return the transmission ratio to a value of the transmission ratio before the transmission ratio change, thereby executing the automatic steering mode.

2. The apparatus according to claim 1, wherein the controller is configured to, after detecting the input variation from the driver steering interface, suspend the automatic steering mode, thereby prioritizing the manual steering mode.

3. The apparatus according to claim 1, wherein the controller is configured to, after detecting the input variation from driver steering interface, use the steering angle input instead of the determined turning angle to actuate the turning gear, thereby prioritizing the manual steering mode.

4. The apparatus according to claim 1, wherein the controller is configured to further change the changed transmission ratio responsive to at least one of the travel path information, a rate of change in the steering angle, and a driver's alertness level.

5. The apparatus according to claim 4, wherein the controller is configured to, if the alertness level is lower than a predetermined first threshold, change the transmission ratio to zero.

6. The apparatus according to claim 1, wherein the controller is configured to use a steering torque from the driver steering interface as an input from the driver steering interface.

7. The apparatus according to claim 1, further comprising a steering angle variator configured to generate a differential angle between the steering angle and the turning angle,
    wherein the controller is configured to control the steering angle variator so as to generate the differential angle responsive to the transmission ratio.

8. The apparatus according to claim 1, wherein the controller is configured to, during execution of the manual steering mode, determine the turning angle using the steering angle and the transmission ratio and control the turning gear actuator so as to achieve the determined turning angle.

9. A steering assistance control system for a vehicle, the vehicle being provided with a driver steering interface and a turning gear configured to have therebetween a transmission ratio that is a ratio of an amount of change in the turning angle to an amount of change in the steering angle, the system comprising:
    one or more processors executing computer instructions from a memory, the instructions causing the one or more processors to:
    execute an automatic steering mode, in which the turning angle is determined based on at least one of a travel condition and travel path information of the vehicle and a turning gear actuator is controlled so as to provide the determined turning angle;
    change the transmission ratio to a value less than the transmission ratio in the automatic steering mode if an input variation from the driver steering interface is detected during execution of the automatic steering mode, and prioritize a manual steering mode, in which the turning gear is actuated responsive to a steering angle input from the driver steering interface, over the automatic steering mode,
    wherein, if no input variation is detected for a predetermined time period after detection of the input variation from the driver steering interface, return the transmission ratio to a value of the transmission ratio before the transmission ratio change, thereby executing the automatic steering mode.

10. A steering assistance apparatus mounted in a vehicle, the vehicle being equipped with a driver steering interface, a steering angle variator, and a turning gear, the steering angle variator being configured to generate a differential angle between a steering angle input from the driver steering interface and a turning angle output from the turning gear, responsive to a transmission ratio that is a ratio of an amount of change in the turning angle to an amount of change in the steering angle, the apparatus comprising:
    a turning gear actuator configured to actuate the turning gear;
    a controller configured to:
    execute an automatic steering mode, in which the controller determines the turning angle based on at least one of a travel condition and travel path information of the vehicle and controls the turning gear actuator to actuate the turning gear so as to provide the determined turning angle,
    determine whether or not there is a variation in the steering angle input from the driver steering interface during execution of the automatic steering mode, and
    in response to determining that there is a variation in the steering angle input from the driver steering interface during execution of the automatic steering mode, change the transmission ratio to a value less than the transmission ratio in the automatic steering mode, and prioritize execution of a manual steering mode, in which the controller determines the turning angle responsive to the steering angle input from the driver steering interface and controls the turning gear actuator to actuate the turning gear so as to provide the determined turning angle, over the automatic steering mode, wherein, if no input variation is detected for a predetermined time period after detection of the input variation from the driver steering interface, return the transmission ratio to a value of the transmission ratio before the transmission ratio change, thereby executing the automatic steering mode.

\* \* \* \* \*